UNITED STATES PATENT OFFICE.

GEORGE H. WALKER AND GUSTAVUS E. GORDON, OF BOSTON, AND JOHN H. WATERHOUSE, OF MALDEN, MASSACHUSETTS.

METHOD OF PREPARING MILK.

SPECIFICATION forming part of Letters Patent No. 539,760, dated May 21, 1895.

Application filed June 9, 1893. Serial No. 477,114. (No specimens.)

*To all whom it may concern:*

Be it known that we, GEORGE H. WALKER and GUSTAVUS E. GORDON, of Boston, in the county of Suffolk, and JOHN H. WATERHOUSE, of Malden, in the county of Middlesex, in the State of Massachusetts, have invented certain new and useful Improvements in the Art of Treating Milk, of which the following is a specification.

This invention has relation to the treatment of milk for the purpose of exactly suiting the same to the individual digestions of consumers in the nursery, sick-room and elsewhere.

It is well known that while original milk is a suitable, and, in some cases, a complete food, it is in many cases unsuitable to peculiar digestions, physical conditions, age, &c., of infants. It is furthermore known that milk varies as to the proportions of the general parts into which it is readily divisible or separable, as the conditions, food and breed of the animal varies, so that different original milks have different effects with the same human digestions.

It is the object of this invention to so treat milk as to render the same suitable for use as an article of food to each and all particular and peculiar cases in the nursery, sick-room and elsewhere, whatever may have been the proportions of its general parts originally.

To these ends the invention consists in the improvement in the art of treating milk comprising the following acts or steps: separating or dividing original milk into (*a*) cream, (*b*) milk without fat, and (*c*) sugar of milk and water; each of which fluids is made to contain a definite and known percentage of milk constituents; then recombining these fluids into milks in accordance with a particular requirement, without regard to the proportions of the original combination, all as is hereinafter fully described and claimed.

In carrying out the invention we may take fresh milk, and, by suitable machinery and formula, separate or divide the same into special parts, producing for example, a cream or milk containing all the fat with a definite, known percentage of albuminoids, milk-sugar and mineral matter, a milk without fat but with a definite and known percentage of albuminoids and milk-sugar and of mineral matter, and sugar of milk and water, bringing or reducing each division or part to a certain definite percentage or grade; so that it is known with certainty what is the composition of each part. We then vary the proportions of such constituents as they may differ from what is required in particular cases by adding thereto or subtracting therefrom, according to what is prescribed for each individual, and recombine the same into a milk representing the prescription written, for the use of the consumer.

For example, if it should be desired to use the milk as a substitute food for human breast milk, and that it should contain four per cent. of fat; seven per cent. of milk-sugar; 1.50 per cent. albuminoids; 0.25 per cent. mineral matter; and 87.25 per cent. water, in recombining the fluids containing these constituents after separation, they will be employed so as to produce the aforesaid required proportions, whatever may have been the portions in the fluids as they were separated.

By this process we are enabled not only to supply pure milk from day to day of a uniform percentage of its constituent parts, but to modify these parts so as to suit the peculiar physical conditions of particular persons.

We do not, of course, confine ourselves to the extent of division and subdivision of parts into which we may separate the original milk, since this may depend upon circumstances governing particular cases. Nor do we limit ourselves to any precise mechanism or certain steps for separating the milk, as it may be accomplished in any of the well known ways that may be desired, the essential feature of the invention being the separating of milk into fluids each containing a stable and definite percentage of milk constituents, and recombining those fluids in accordance with a particular prescription. For example, it may sometimes be convenient and advisable not to separate the sugar of milk and water from the milk without fat, but to leave these constituents combined in a certain and known ratio. It is also obvious that in combining the fluids into milk it may be necessary to add thereto sugar of milk, distilled water, or other constituents of milk if required by the prescription.

What we claim is—

The improvement in the art of treating milk which consists in dividing or separating a quantity of original milk into cream, milk without fat, and sugar of milk and water; each of which fluids is made to contain a definite and known percentage of milk constituents; then recombining these fluids into milks in accordance with a particular prescription or requirement, without regard to the proportions of the original combination.

In witness whereof we have signed our names to this specification, in the presence of two subscribing witnesses, this 12th day of May, A. D. 1893.

GEO. H. WALKER.
  GUSTAVUS E. GORDON.
  JOHN H. WATERHOUSE.

Witnesses as to Geo. H. Walker and Gustavus E. Gordon:
 HENRY D. WINANS,
 E. J. AMBREY.

Witnesses as to John H. Waterhouse:
 ARTHUR W. CROSSLEY,
 F. PARKER DAVIS.